C. Tracy,
Fish Seine,
Nº 932.  Patented Sep. 19, 1838.
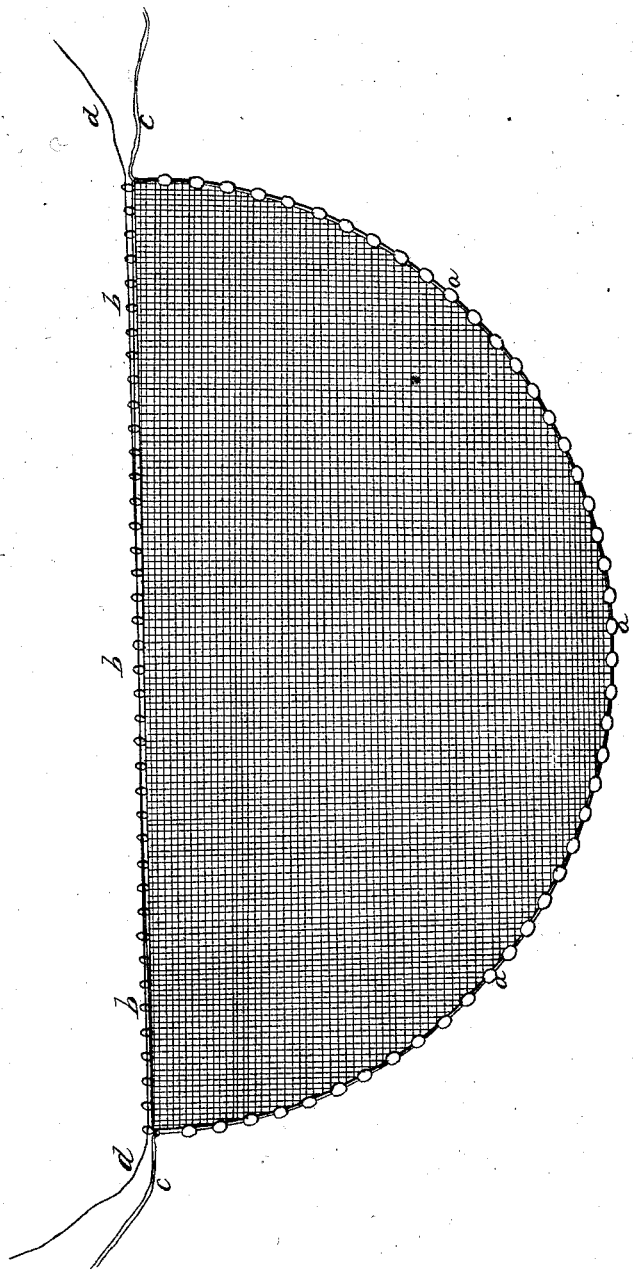

UNITED STATES PATENT OFFICE.

CYRUS TRACY, OF CENTER VILLAGE, GEORGIA.

IMPROVED MODE OF CONSTRUCTING AND USING FISHING-SEINES.

Specification forming part of Letters Patent No. 932, dated September 19, 1838.

*To all whom it may concern:*

Be it known that I, CYRUS TRACY, of Center Village, in the county of Camden and State of Georgia, have invented a new and Improved Mode of Constructing and Using Fishing-Seines; and I do hereby declare that the following is a full and exact description.

The nature of my invention consists in drawing a seine under the fish or holding it in an extended position till such fish as move at the surface of the water and in a direction with the tide or current shall have passed into it, when the seine is closed and the fish secured.

To enable others skilled in the art to make and use my invention, I will proceed to describe its construction and operation.

I construct my seine in a semicircular form, as shown in the accompanying drawing, knit full, so as to swell into a pot or bag behind when in operation, or tight, so that when extended each mesh shall bear the same tension nearly. To the circular side are attached corks $a\ a\ a$, or buoys, to support it at the surface of the water, and to the straight side a number of rigger's thimbles, $b\ b\ b$, are attached; and if more weight is found necessary it may be loaded with lead.

To each corner of the seine a rope, $c\ c$, of sufficient strength, is made fast, and the other ends made fast to two boats, by which, either with oars, sails, or anchors, it may be drawn forward under the fish or held in that position till the fish have passed into it. Two other ropes, $d\ d$, are made fast, one at each corner of the seine, each of which passes through all the thimbles to its opposite corner, and from thence to the boats.

To operate or draw the seine, let it be stowed or hauled equally on the sterns of both the boats, beginning at the corners of the seine, and the boats then are to be lashed together, so as to be rowed as one boat; or, if larger vessels are employed, the seine may be stowed wholly on one of them, the other taking the ropes belonging to it when it is necessary to spread the seine. Both boats or vessels must then be moved from each other, the seine being regularly thrown from one or both, as the case may be. The straight side will then sink several feet in the middle, while the circular side will be kept at the surface by the buoys. When the fish have passed into the seine or it has been drawn under them, if the boats or vessels are at anchor, the first-mentioned ropes must be slacked up, and by hauling on the second-mentioned ropes the corners of the seines will be brought together and the fish inclosed; or, if not at anchor, the boats or vessels may be brought together with the corners of the seine. The seine may then be hauled onto the sterns of both or the stern of one boat or vessel till the fish are confined in a space small enough to be taken out with scoop-nets, or hoisted on board in the seine, or, if near the shore, can be carried on shore in the seine.

What I claim as my invention is—

The particular mode of constructing and the manner of using a seine for the purpose of catching fish in deep waters, such as the sea, forming the seine and serving the ropes as herein particularly set forth.

CYRUS TRACY.

Witnesses:
ERASMUS D. TRACY,
PLINY CARTER.